US012571677B2

(12) United States Patent
Yang et al.

(10) Patent No.: US 12,571,677 B2
(45) Date of Patent: Mar. 10, 2026

(54) APPROXIMATION-FREE AND ITERATION-FREE METHOD FOR SPECTRAL ANALYSIS OF INTRACAVITY ELECTRO-OPTIC MODULATION TYPE OPTICAL FREQUENCY COMB, DEVICE AND MEDIUM

(71) Applicant: Harbin Institute of Technology, Harbin (CN)

(72) Inventors: Ruitao Yang, Harbin (CN); Pengcheng Hu, Harbin (CN); Jiubin Tan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 788 days.

(21) Appl. No.: 17/963,254

(22) Filed: Oct. 11, 2022

(65) Prior Publication Data

US 2023/0243700 A1     Aug. 3, 2023

(30) Foreign Application Priority Data

Jan. 28, 2022     (CN) ......................... 202210107283.4

(51) Int. Cl.
*G01J 3/28*          (2006.01)
*G01J 3/02*          (2006.01)
*G01J 3/12*          (2006.01)
(52) U.S. Cl.
CPC ............... *G01J 3/28* (2013.01); *G01J 3/0218* (2013.01); *G01J 3/12* (2013.01)
(58) Field of Classification Search
CPC .... G01J 3/28; G01J 3/0218; G01J 3/12; G01J 2003/1269; G01J 3/26; G01J 3/433; Y02E 60/00; G01N 21/25; G06F 30/20
See application file for complete search history.

(56) References Cited

U.S. PATENT DOCUMENTS 9,778,110 B1 * 10/2017 Rella ......................... G01J 3/10
2023/0332879 A1 * 10/2023 Vakoc .................... H01S 3/107

FOREIGN PATENT DOCUMENTS

WO     WO-2016048740 A2 *  3/2016  ............. H01S 3/105

OTHER PUBLICATIONS

Rabiei, Payam. "A simple and fast frequency domain analysis method for calculating the frequency response and linearity of electro-optic microring modulators." arXiv preprint arXiv:1710.00770 (2017) (Year: 2017).*

* cited by examiner

*Primary Examiner* — Stephanie E Bloss
(74) *Attorney, Agent, or Firm* — IPRO, PLLC; Na Xu

(57)          ABSTRACT

An approximation-free and iteration-free method for spectral analysis of an intracavity electro-optic modulation type optical frequency comb, includes: calculating a residual phase delay of a single propagation of laser in a resonant cavity, analyzing outgoing transmission characteristics of a light source of the intracavity electro-optic modulation type optical frequency comb, accumulating laser electric field intensities corresponding to all cyclic propagation times n to obtain an outgoing laser electric field intensity E, obtaining a new approximate-free outgoing laser electric field intensity E' of the intracavity electro-optic modulation type optical frequency comb, obtaining an outgoing laser electric field intensity Ek' of kth-order comb teeth, calculating an outgoing laser light intensity Ik of the kth-order comb teeth and accurately analyzing a spectrum of the intracavity electro-optic modulation type optical frequency comb, determining a working state according to a simulated spectral envelope curve, and guiding the subsequent optimization design and debugging.

9 Claims, 4 Drawing Sheets

APPROXIMATION-FREE AND ITERATION-FREE METHOD FOR SPECTRAL ANALYSIS OF INTRACAVITY ELECTRO-OPTIC MODULATION TYPE OPTICAL FREQUENCY COMB, DEVICE AND MEDIUM

TECHNICAL FIELD

The present disclosure belongs to the technical field of laser, and in particular relates to an approximation-free and iteration-free method for spectral analysis of an intracavity electro-optic modulation type optical frequency comb, a device and a medium.

BACKGROUND

Optical frequency combs have brought revolutionary development to cutting-edge core technologies such as high-bandwidth laser communication, ultra-precision spectral analysis, and large-scale high-precision laser ranging due to their unique equal-spaced comb-like multispectral frequency domain characteristics. A single intensity or phase electro-optic modulator can convert a single-frequency CW laser into a comb-like signal with a plurality of equal-spaced modulation sidebands. An optical resonant cavity is used for enhancing the electro-optic modulation effect, which can increase the modulation sidebands and thus generate an optical frequency comb with a wider spectral range. The optical frequency comb repetition frequency generated by an optical frequency comb light source based on intracavity electro-optic modulation can be freely set and regulated within a range of several MHz to tens of GHz, so that the light source is an ideal optical frequency comb light source for realizing high bandwidth laser communication and all-optical arbitrary waveform generation.

In order to achieve the high-quality high bandwidth laser communication and the all-optical arbitrary waveform generation, it is required to accurately estimate the specific energy of each comb tooth in the optical frequency comb. Therefore, a high-precision optical frequency comb spectral analysis method is of great significance. The existing spectral analysis methods of an intracavity electro-optic modulation type optical frequency comb are mainly divided into two types, both of which are firstly proposed by Japanese scholar M. Kourogi et al. [Wide-Span Optical Frequency Comb Generator for Accurate Optical Frequency Difference Measurement, IEEE Journal of Quantum Electronics, 1993, 29: 2693-2701] in 1993.

According to the first type of spectral analysis method of the intracavity electro-optic modulation type optical frequency comb, an accurate optical frequency comb spectrum is obtained by iteratively calculating the energy coupling between every two adjacent comb teeth in a cavity. Ideally, the simulation analysis of the method needs to calculate the energy coupling of infinite comb teeth to a specific comb tooth, and then use the updated energy of each comb tooth to calculate the energy coupling to the next comb tooth, so that the accurate spectral distribution of the optical frequency comb can be obtained through continuous iterative calculation. However, in the actual application process, the calculation can only be performed for a limited number of comb teeth, and the simulation error introduced by this will accumulate continuously with the iterative energy coupling effect between the comb teeth. If the number of the comb teeth involved in the calculation is too small, it is difficult for simulation accuracy to meet the requirement. If the number of the comb teeth involved in the simulation is increased, the simulation time will be greatly prolonged due to the iterative calculation process. Therefore, the authors who proposed the method admit that the analysis and calculation process is too complicated to give consideration to both simulation accuracy and efficiency. In the paper published by German scholar Richard P. Kovacich et al. [Short-pulse properties of optical frequency comb generators, Applied Optics, 2000, 39: 4372-4376], although the simulation process was accelerated by using matrix calculation, the core problem that the simulation error of the analysis method accumulates with the iterative calculation of the finite comb teeth is still not solved.

According to the second type of spectral analysis method of the intracavity electro-optic modulation type optical frequency comb, a working state of the intracavity electro-optic modulation type optical frequency comb is limited to meet multiple mathematical approximation conditions, and an approximate optical frequency comb spectrum is further obtained. The simulation error is introduced by multiple mathematical approximations of the analysis method. More importantly, the preconditions for these approximations require that the incident laser frequency, the resonant frequency of the resonant cavity and the modulation frequency must be exactly matched. However, in the actual use process, it is difficult to guarantee the exact matching of the above three parameters even if they are stably controlled. Therefore, this type of analysis method is only suitable for ideal conditions. In real scenarios, the simulation error is unavoidable or even impossible to simulate.

To sum up, at present, the light source of the intracavity electro-optic modulation type optical frequency comb urgently needs a spectral analysis method that takes both accuracy and computational efficiency into account. In particular, there is lack of an approximation-free and iteration-free spectral analysis method for the light source of the intracavity electro-optic modulation type optical frequency comb.

SUMMARY

In order to solve the problem that the existing intracavity electro-optic modulation type optical frequency comb lacks a spectral analysis method that takes both accuracy and computational efficiency into account, the present disclosure provides an approximation-free and iteration-free method for spectral analysis of an intracavity electro-optic modulation type optical frequency comb, a device and a medium.

The present disclosure is implemented by adopting the following technical solutions. The present disclosure provides an approximation-free and iteration-free method for spectral analysis of an intracavity electro-optic modulation type optical frequency comb, and the method specifically includes the following steps:

step 1: calculating a residual phase delay of a single propagation of laser in a resonant cavity according to an incident laser frequency of a light source of the intracavity electro-optic modulation type optical frequency comb, a resonant frequency of the resonant cavity, and an intracavity electro-optic modulation frequency in combination with intracavity material dispersion conditions;

step 2: analyzing outgoing transmission characteristics of the light source of the intracavity electro-optic modulation type optical frequency comb, and obtaining corresponding outgoing laser electric field intensities $E_n$ according to cyclic propagation times n in the resonant cavity, where due to electro-optic modulation in the resonant cavity, exponential terms of $E_n$ contain trigonometric function coefficients;

step 3: accumulating the outgoing laser electric field intensities $E_n$ corresponding to all the cyclic propagation times n to obtain a complete outgoing laser electric field intensity E of the intracavity electro-optic modulation type optical frequency comb, where each exponential term of E also contains trigonometric function coefficients;

step 4: using a Jacobi-Anger identical deformation to reduce the exponential terms, containing the trigonometric function coefficients, of E in step 3 to a cumulative sum of infinite harmonic terms based on a Bessel function in an approximate-free manner, so as to obtain a new outgoing laser electric field intensity E' of the intracavity electro-optic modulation type optical frequency comb;

step 5: regarding the outgoing laser electric field intensity E' of the intracavity electro-optic modulation type optical frequency comb obtained in step 4 as a Fourier series, and extracting an outgoing laser electric field intensity $E_k$' of $k^{th}$-order comb teeth;

step 6: using a method of matrix calculation to multiply $E_k$' in step 5 with its own conjugate to obtain an outgoing laser light intensity $I_k$ of the $k^{th}$-order comb teeth, and accurately analyzing a spectrum of the intracavity electro-optic modulation type optical frequency comb in accordance with the outgoing laser light intensity $I_k$; and step 7: determining a current working state of the light source of the intracavity electro-optic modulation type optical frequency comb by comparing a measured spectrum of the optical frequency comb according to the precise spectral analysis of the intracavity electro-optic modulation type optical frequency comb in steps 1 to 6 and simulation results of a spectral envelope curve, and further guiding the subsequent optimization design and debugging.

Further, a resonant cavity structure of the light source of the intracavity electro-optic modulation type optical frequency comb in step 1 is a linear cavity, a ring cavity, a folded cavity or a composite cavity.

Further, an implementation way of the light source of the intracavity electro-optic modulation type optical frequency comb in step 1 is an electro-optic modulation optical frequency comb light source based on a discrete spatial optical device, an electro-optic modulation optical frequency comb light source based on an integrated optical fiber ring cavity, or an electro-optic modulation optical frequency comb light source based on an on-chip micro-resonant cavity.

Further, the residual phase delay of the single propagation of the laser in the resonant cavity in step 1 comprises three types of residual phase delay: the first type of residual phase delay is a residual phase delay introduced due to a mismatch between the incident laser frequency and the resonant frequency of the resonant cavity; the second type of residual phase delay is a residual phase delay introduced due to a mismatch between the resonant frequency of the resonant cavity and the electro-optic modulation frequency; and the third type of residual phase delay is a residual phase delay introduced due to intracavity material dispersion.

Further, the analysis of the outgoing transmission characteristics of the light source of the intracavity electro-optic modulation type optical frequency comb in step 2 is any one of the following four analyses: the first type is analysis of an outgoing transmission model based on a spatial double-mirror linear cavity; the second type is analysis of an outgoing transmission model based on a multi-mirror ring cavity; the third type is analysis of an outgoing transmission model based on the optical fiber ring cavity; and the fourth type is analysis of an outgoing transmission model based on the on-chip micro-resonant cavity.

Further, the outgoing laser electric field intensity $E_n$ in step 2 is either of the following two types: the first type is transmitted laser electric field intensity $E_{Tn}$; and the second type is reflected laser electric field intensity $E_{rn}$.

Further, when the laser electric field intensities $E_n$ are accumulated in step 3, all the cyclic propagation times n involved in the accumulative calculation should satisfy that a laser light intensity $I_n$ obtained by multiplying the corresponding laser electric field intensity $E_n$ with its own conjugate is always greater than 0 in the presence of a floating-point truncation error.

Further, a simulation calculation method of the outgoing laser light intensity $I_k$ obtained by multiplying $E_k$' in step 6 with its own conjugate is a direct calculation method or an indirect calculation method; the direct calculation method is a direct calculation method of repeatedly calling the Bessel function to generate a complete $E_k$' and its conjugate, and performing matrix multiplication; and the indirect calculation method is an indirect calculation method of generating a complete Bessel function parameter set in advance, calling the parameter set to generate $E_k$' and its conjugate, and only performing multiplication and cumulative operations.

The present disclosure provides an electronic device, which includes a memory and a processor, computer programs are stored in the memory, and the processor implements the steps of the approximation-free and iteration-free method for the spectral analysis of the intracavity electro-optic modulation type optical frequency comb when executing the computer programs.

The present disclosure further provides a computer-readable storage medium for storing computer instructions, and the steps of the approximation-free and iteration-free method for the spectral analysis of the intracavity electro-optic modulation type optical frequency comb are implemented when the computer instructions are executed by a processor.

The present disclosure has the beneficial effects that:

1. The spectral analysis precision is high. The method provided by the present disclosure does not involve mathematical approximations, and the exponential terms containing the trigonometric function coefficients are directly simplified to the cumulative sum of infinite harmonic terms based on the Bessel function in the analysis process by using the Jacobi-Anger identical deformation, so that the spectral analysis precision is high.

2. The spectral analysis speed is fast. The method provided by the present disclosure does not involve iterative operations, and a key parameter in the analysis process is the cyclic propagation times n in the resonant cavity, the parameter is incremented uniaxially, and the analysis calculation has no round-trip iteration process, so that the analysis speed is fast.

3. It can be used in various working modes. The method provided by the present disclosure does not depend on special conditions, thus can be used for analyzing various working modes of the light source of the intracavity electro-optic modulation type optical frequency comb.

4. The working state can be determined to guide the subsequent optimization design and debugging. The method provided by the present disclosure can provide an accurate simulation spectrum. By comparing the actual observed spectrum state, the working state of the light source of the intracavity electro-optic modulation type optical frequency comb can be determined, which is the basis for guiding the subsequent optimization design and debugging of the light source of the intracavity electro-optic modulation type optical frequency comb.

DETAILED DESCRIPTION

Figure 1:
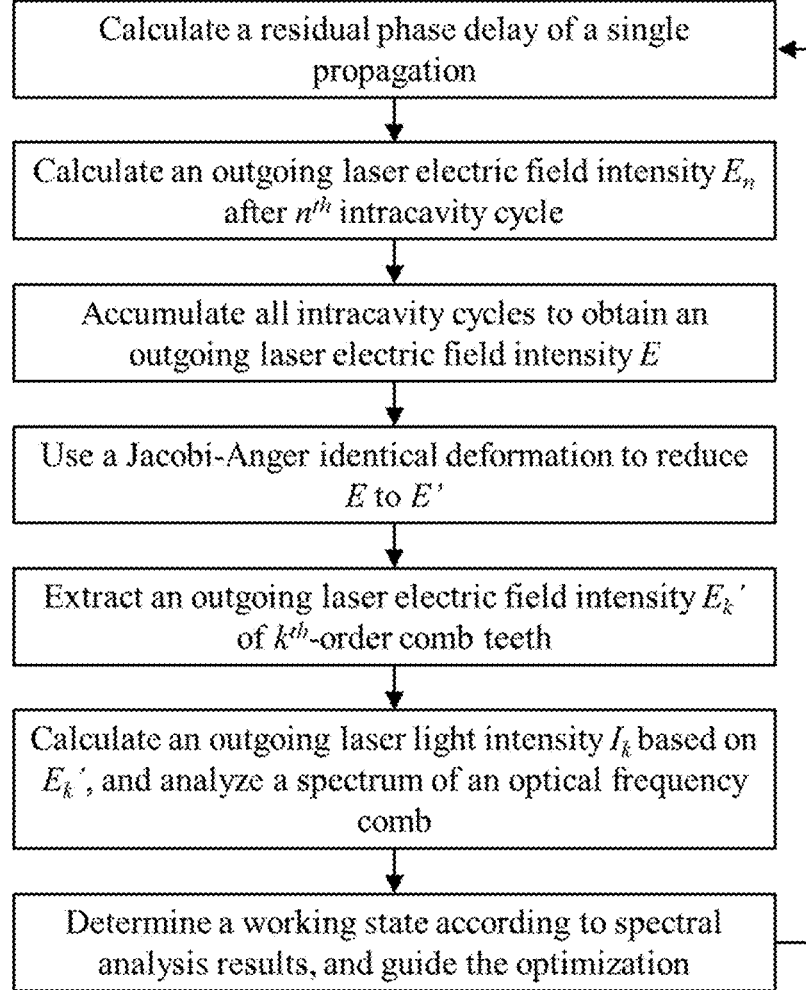
FIG. 1 is a flowchart of a method according to the present disclosure.

The technical solutions in the embodiments of the present disclosure will be clearly and completely described below with reference to the drawings in the embodiments of the present disclosure. It is obvious that the described embodiments are part of the embodiments of the present disclosure and not all of the embodiments. Based on the embodiments of the present disclosure, all other embodiments obtained by those of ordinary skill in the art without creative labor shall fall within the protection scope of the present disclosure.

In conjunction with FIGS. 1 to 4, the present disclosure provides an approximation-free and iteration-free method for spectral analysis of an intracavity electro-optic modulation type optical frequency comb, and the method specifically includes the following steps:

step 1: a residual phase delay of a single propagation of laser in a resonant cavity is calculated according to an incident laser frequency of a light source of the intracavity electro-optic modulation type optical frequency comb, a resonant frequency of the resonant cavity, and an intracavity electro-optic modulation frequency in combination with intracavity material dispersion conditions;

step 2: outgoing transmission characteristics of the light source of the intracavity electro-optic modulation type optical frequency comb is analyzed, and corresponding outgoing laser electric field intensities $E_n$ are obtained according to cyclic propagation times n in the resonant cavity, where due to electro-optic modulation in the resonant cavity, exponential terms of $E_n$ contain trigonometric function coefficients;

step 3: the outgoing laser electric field intensities $E_n$ corresponding to all the cyclic propagation times n are accumulated to obtain a complete outgoing laser electric field intensity E of the intracavity electro-optic modulation type optical frequency comb, where each exponential term of E also contains trigonometric function coefficients;

step 4: a Jacobi-Anger identical deformation is used to reduce the exponential terms, containing the trigonometric function coefficients, of E in step 3 to a cumulative sum of infinite harmonic terms based on a Bessel function in an approximate-free manner, so as to obtain a new outgoing laser electric field intensity E' of the intracavity electro-optic modulation type optical frequency comb;

step 5: the outgoing laser electric field intensity E' of the intracavity electro-optic modulation type optical frequency comb obtained in step 4 is regarded as a Fourier series, and an outgoing laser electric field intensity $E_k'$ of $k^{th}$-order comb teeth is extracted;

step 6: a method of matrix calculation is used to multiply $E_k'$ in step 5 with its own conjugate to obtain an outgoing laser light intensity $I_k$ of the $k^{th}$-order comb teeth, and a spectrum of the intracavity electro-optic modulation type optical frequency comb is accurately analyzed in accordance with the outgoing laser light intensity $I_k$; and step 7: a current working state of the light source of the intracavity electro-optic modulation type optical frequency comb is determined by comparing a measured spectrum of the optical frequency comb according to the precise spectral analysis of the intracavity electro-optic modulation type optical frequency comb in steps 1 to 6 and simulation results of a spectral envelope curve, and the subsequent optimization design and debugging are further guided.

A resonant cavity structure of the light source of the intracavity electro-optic modulation type optical frequency comb in step 1 is a linear cavity, a ring cavity, a folded cavity or a composite cavity.

An implementation way of the light source of the intracavity electro-optic modulation type optical frequency comb in step 1 is an electro-optic modulation optical frequency comb light source based on a discrete spatial optical device, an electro-optic modulation optical frequency comb light source based on an integrated optical fiber ring cavity, or an electro-optic modulation optical frequency comb light source based on an on-chip micro-resonant cavity.

The residual phase delay of the single propagation of the laser in the resonant cavity in step 1 comprises three types of residual phase delay: the first type of residual phase delay is a residual phase delay introduced due to a mismatch between the incident laser frequency and the resonant frequency of the resonant cavity; the second type of residual phase delay is a residual phase delay introduced due to a mismatch between the resonant frequency of the resonant cavity and the electro-optic modulation frequency; and the third type of residual phase delay is a residual phase delay introduced due to intracavity material dispersion.

The analysis of the outgoing transmission characteristics of the light source of the intracavity electro-optic modulation type optical frequency comb in step 2 is any one of the following four analyses: the first type is analysis of an outgoing transmission model based on a spatial double-mirror linear cavity; the second type is analysis of an outgoing transmission model based on a multi-mirror ring cavity; the third type is analysis of an outgoing transmission model based on the optical fiber ring cavity; and the fourth type is analysis of an outgoing transmission model based on the on-chip micro-resonant cavity.

The outgoing laser electric field intensity $E_n$ in step 2 is either of the following two types: the first type is transmitted laser electric field intensity $E_{tn}$; and the second type is reflected laser electric field intensity $E_{rn}$.

The maximum value of the cyclic propagation times n in step 3 can be positive infinity in the actual physical process, but the infinite term cannot be calculated, so that the cyclic propagation times n must be limited. In order to avoid the influence of too little value of n on the spectral analysis accuracy of the intracavity electro-optic modulation type optical frequency comb, the laser electric field intensities $E_n$ corresponding to different cyclic propagation times n should be calculated, and the laser light intensities $I_n$ corresponding to the different cyclic propagation times n are obtained by multiplying $E_n$ with its own conjugate; due to the existence of data truncation error, $I_n$ gradually decreases to 0 with the increase of n value; and therefore, in step 3, the accumulation of the laser electric field intensities $E_n$ should select all the cyclic propagation times n corresponding to laser light intensity $I_n$ being greater than 0 which correspond to different cyclic propagation times n and obtained by multiplying $E_n$ with its own conjugate.

A simulation calculation method of the outgoing laser light intensity $I_k$ obtained by multiplying $E_k'$ in step 6 with its own conjugate is a direct calculation method or an indirect calculation method; the direct calculation method is a direct calculation method of repeatedly calling the Bessel function to generate a complete $E_k'$ and its conjugate, and performing matrix multiplication; and the indirect calculation method is an indirect calculation method of generating a complete Bessel function parameter set in advance, calling the parameter set to generate $E_k'$ and its conjugate, and only performing multiplication and cumulative operations.

The present disclosure provides an electronic device, which includes a memory and a processor, computer programs are stored in the memory, and the processor implements the steps of the approximation-free and iteration-free method for the spectral analysis of the intracavity electro-optic modulation type optical frequency comb when executing the computer programs.

The present disclosure further provides a computer-readable storage medium for storing computer instructions, and the steps of the approximation-free and iteration-free method for the spectral analysis of the intracavity electro-optic modulation type optical frequency comb are implemented when the computer instructions are executed by a processor.

Figure 2:
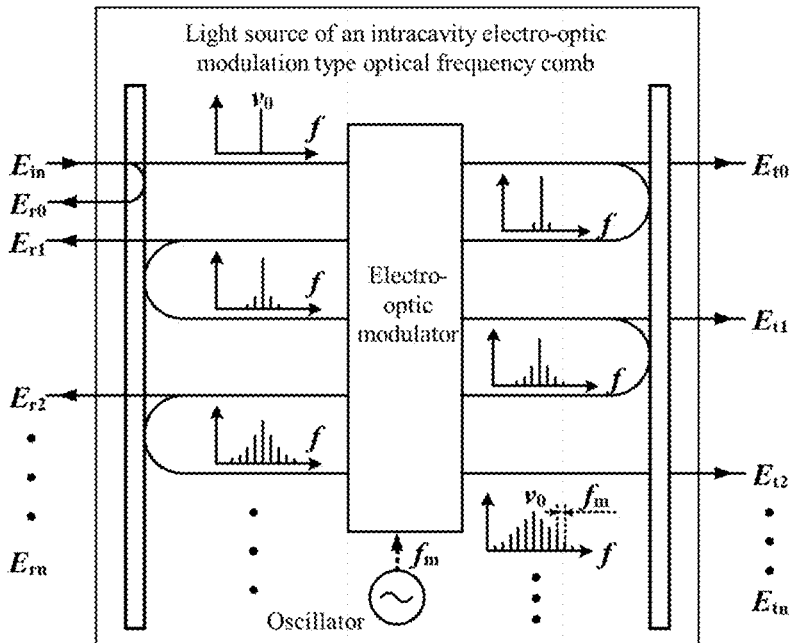
FIG. 2 is a schematic diagram of a light source of an intracavity electro-optic phase modulation optical frequency comb involved in an embodiment provided by the present disclosure.

In combination with a specific implementation in FIG. 2, the spectrum of the intracavity electro-optic modulation optical frequency comb having a spatial optical linear cavity structure will be analyzed, and the method provided by the present disclosure will be further described in detail.

Step 1: a residual phase delay of a single propagation of laser in a resonant cavity is calculated according to an incident laser frequency of a light source of the intracavity electro-optic phase modulation optical frequency comb, a resonant frequency of the resonant cavity, and an intracavity electro-optic modulation frequency in combination with intracavity material dispersion conditions, and the residual phase delay $\phi_F$ can be expressed as follows:

$$\phi_F = \phi_\alpha + \phi_{\Delta f} + \phi_D \tag{1}$$

$$= \frac{\pi \delta v}{v_{FSR}} + \frac{k\pi \Delta f_m}{v_{FSR}} + \frac{GVDL_c(2\pi k f_m)^2}{2}$$

The mismatched phase delay $\phi_\alpha$ is introduced due to the difference between the incident laser frequency and the resonant frequency of the resonant cavity, the mismatched phase delay $\phi_{\Delta f}$ is introduced due to the difference between the electro-optic modulation frequency and the resonant frequency of the resonant cavity, the dispersion phase delay $\phi_D$ is introduced due to the dispersion of materials in the resonant cavity, $\delta v$ is the difference between the incident laser frequency and the adjacent resonant frequency of the resonant cavity, $v_{FSR}$ is the resonant frequency of the resonant cavity, k is the number of electro-optic modulation comb orders, $\Delta f_m$ is the difference between the electro-optic phase modulation frequency and the resonant frequency of the resonant cavity, GVD is intracavity group velocity dispersion, $L_c$ is the geometric length of an intracavity electro-optic phase modulator, and $f_m$ is an electro-optic phase modulation frequency.

Step 2: outgoing transmission characteristics of the light source of the intracavity electro-optic phase modulation optical frequency comb are analyzed, and corresponding laser electric field intensities $E_{tn}$ are obtained according to cyclic propagation times n in the resonant cavity, due to electro-optic modulation in the resonant cavity, exponential terms of $E_{tn}$ contain trigonometric function coefficients, and for the light source of the intracavity electro-optic modulation optical frequency comb having the spatial optical linear cavity structure, $E_{tn}$ can be expressed as:

$$E_{tn} = R^n e^{-j(2n+1)(\phi_F + \beta \sin \omega_m t)} \tag{2}$$

R is total reflectivity of laser propagating in the resonant cavity for one cycle, $\beta$ is a modulation index of electro-optic phase modulation, and $\omega_m$ is a modulation angular frequency of the electro-optic phase modulation.

Step 3: the laser electric field intensities $E_{tn}$ corresponding to all the cyclic propagation times n are accumulated to obtain a complete transmitted laser electric field intensity $E_t$ of the intracavity electro-optic phase modulation optical frequency comb, each exponential term of $E_t$ also contains trigonometric function coefficients, and $E_t$ can be expressed as:

$$E_t = E_{in}(1-R)\sum_{n=0}^{\infty} R^n e^{-j(2n+1)(\phi_F + \beta \sin \omega_m t)} \tag{3}$$

$E_{in}$ is the electric field intensity of the incident laser.

Step 4: a Jacobi-Anger identical deformation is used to simplify the exponential terms, containing the trigonometric function coefficients, of $E_t$ in step 3 to a cumulative sum of infinite harmonic terms based on a Bessel function in an approximate-free manner, so as to obtain a new transmitted laser electric field intensity $E_t'$ of the intracavity electro-optic phase modulation optical frequency comb, and $E_t'$ can be expressed as:

$$E_t' = E_{in}(1-R)\sum_{n=0}^{\infty} R^n e^{-j(2n+1)\phi_F} \sum_{k=-\infty}^{\infty} J_k[(2n+1)\beta]e^{-jk\omega_m t} \tag{4}$$

$J_k[(2n+1)\beta]$ represents the first type of Bessel function with order of k and independent variable of $(2n+1)\beta$.

Step 5: the transmitted laser electric field intensity $E_t'$ of the intracavity electro-optic phase modulation optical frequency comb obtained in step 4 is regarded as a Fourier series, and a transmitted laser electric field intensity $E_{tk}'$ of $k^{th}$-order comb teeth is extracted, and $E_{tk}'$ can be expressed as:

$$E'_{tk} = E_{in}(1 - R)\sum_{n=0}^{\infty} R^n J_k[(2n + 1)\beta]e^{-j(2n+1)\phi_F} \qquad (5)$$

Step 6: a method of matrix calculation is used to multiply $E_{tk}'$ of step 5 with its own conjugate to obtain a transmitted laser light intensity $I_{tk}$ of the $k^{th}$-order comb teeth, and a spectrum of the intracavity electro-optic phase modulation optical frequency comb is accurately analyzed in accordance with the transmitted laser light intensity $I_{tk}$, and $I_{tk}$ can be expressed as:

$$I_{tk} = E_{in}^2(1 - R)^2 \qquad (6)$$

$$\{J_k(\beta)e^{j\phi_F} + RJ_k(3\beta)e^{j3\phi_F} + R^2 J_k(5\beta)e^{j5\phi_F} + \dots + R^n J_k(\beta_n)e^{j\phi_{Fn}}\} \times$$

$$\{J_k(\beta)e^{-j\phi_F} + RJ_k(3\beta)e^{-j3\phi_F} + R^2 J_k(5\beta)e^{-j5\phi_F} + \dots + R^n J_k(\beta_n)e^{-j\phi_{Fn}}\}$$

$\phi_{Pn}$ represents the residual phase delay circularly propagating n times in the resonant cavity.

Figure 3:
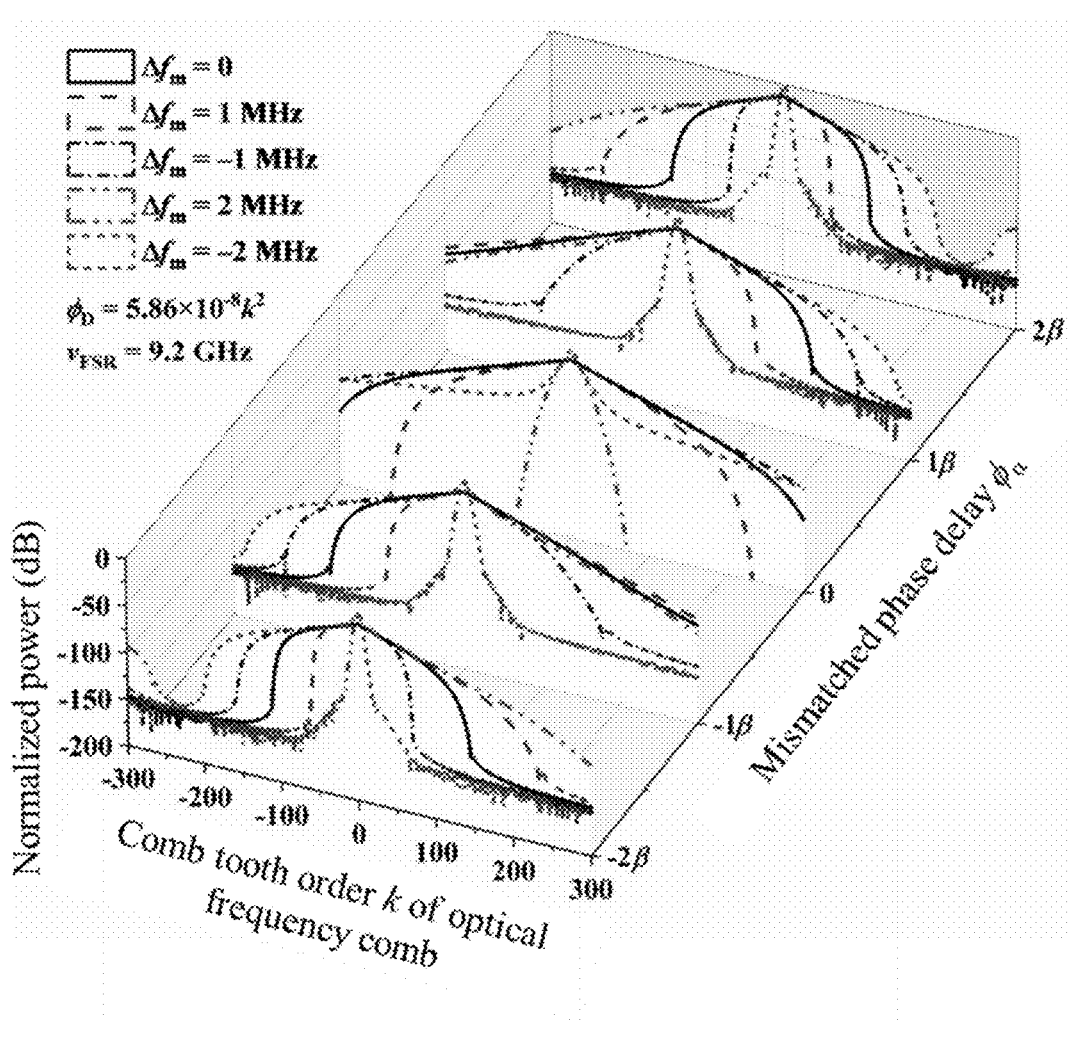
FIG. 3 is a spectral envelope simulation curve chart of an intracavity electro-optic phase modulation optical frequency comb involved in step 7 of an embodiment provided by the present disclosure.

Step 7: steps 1 to 6 are used to accurately analyze the spectrum of the intracavity electro-optic phase modulation optical frequency comb, various simulation parameters are brought in to obtain a spectral envelope simulation curve set as shown in FIG. 3, a current working state of the light source of the intracavity electro-optic phase modulation optical frequency comb is determined according to a fitting effect of the measured spectral envelope curve and the simulation curve set, and the optimization design and debugging are further guided.

Figure 4:
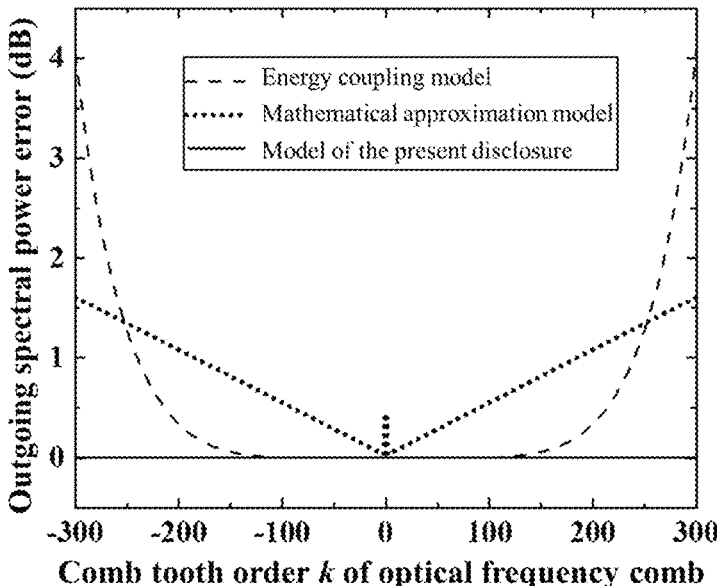
FIG. 4 is a schematic diagram of a comparison result between the method described in the present disclosure and other methods.

According to the approximation-free and iteration-free method for the spectral analysis of the intracavity electro-optic modulation type optical frequency comb provided by the present disclosure, since the analysis process includes all known influencing factors of the intracavity electro-optic modulation type optical frequency comb light source, and the modeling analysis process does not include any mathematical approximation, it can be considered that the error is only introduced due to the data truncation error in step 3. Compared with the existing method for analyzing the spectrum of the optical frequency comb by iteratively calculating the energy coupling among all comb teeth in the cavity, and the method for approximately analyzing the spectrum of the optical frequency comb by limiting the working state of the intracavity electro-optic modulation type optical frequency comb, the method for the spectral analysis of the intracavity electro-optic modulation type optical frequency comb provided by the present disclosure is higher in accuracy, as shown in FIG. 4. Furthermore, the calculation process without iteration ensures the higher calculation efficiency of the method for the spectral analysis of the intracavity electro-optic modulation type optical frequency comb provided by the present disclosure.

The approximation-free and iteration-free method for the spectral analysis of the intracavity electro-optic modulation type optical frequency comb, the device and the medium which are provided by the present disclosure have been described above in detail. Specific examples are used herein to illustrate the principles and implementations of the present disclosure. The description of the above embodiments is only used for helping understand the method of the present disclosure and its core idea; and furthermore, for those of ordinary skill in the art, according to the concept of the present disclosure, there will be changes in specific implementations and application scope. To sum up, the content of the specification should not be construed as a limitation to the present disclosure.

What is claimed is:

1. A method comprising:
   step 1: calculating a residual phase delay of a single propagation of laser in a resonant cavity according to an incident laser frequency of a light source of an intracavity electro-optic modulation type optical frequency comb, a resonant frequency of the resonant cavity, an intracavity electro-optic modulation frequency, and intracavity material dispersion;
   step 2: performing an analysis of outgoing transmission characteristics of the light source, and obtaining corresponding outgoing laser electric field intensities $E_n$ according to cyclic propagation times n in the resonant cavity;
   step 3: accumulating the outgoing laser electric field intensities $E_n$ corresponding to all the cyclic propagation times n to obtain a complete outgoing laser electric field intensity E;
   step 4: using a Jacobi-Anger expansion on the complete outgoing laser electric field intensity E to obtain a cumulative sum of infinite harmonic terms based on a Bessel function in an approximate-free manner;
   step 5: extracting an outgoing laser electric field intensity $E_k'$ of $k^{th}$-order comb teeth from the cumulative sum;
   step 6: obtaining an outgoing laser light intensity $I_k$ of the $k^{th}$-order comb teeth, and performing a spectral analysis of the intracavity electro-optic modulation type optical frequency comb in accordance with the outgoing laser light intensity $I_k$;
   step 7: determining a current working state of the light source by comparing a measured spectrum of the intracavity electro-optic modulation type optical frequency comb based on the spectral analysis and simulation results of a spectral envelope curve; and
   step 8: adjusting a physical parameter of the intracavity electro-optic modulation type optical frequency comb based on the current working state, wherein the physical parameter is selected from a group consisting of:
      (1) the incident laser frequency;
      (2) the intracavity electro-optic modulation frequency;
      (3) the intracavity material dispersion; and
      (4) a geometric length of the resonant cavity.

2. The method according to claim 1, wherein the resonant cavity is a linear cavity, a ring cavity, a folded cavity or a composite cavity.

3. The method according to claim 1, wherein the light source comprises a discrete spatial optical device, an integrated optical fiber ring cavity, or an on-chip micro-resonant cavity.

4. The method according to claim 1, wherein the residual phase delay is selected from the group consisting of: a residual phase delay due to a mismatch between the incident laser frequency and the resonant frequency; a residual phase delay due to a mismatch between the resonant frequency and the intracavity electro-optic modulation frequency; a residual phase delay due to the intracavity material dispersion; and any combination thereof.

5. The method according to claim 1, wherein the analysis of the outgoing transmission characteristics selected from the group consisting of: an analysis of an outgoing transmission model based on a spatial double-mirror linear cavity; an analysis of an outgoing transmission model based on a multi-mirror ring cavity; an analysis of an outgoing transmission model based on an optical fiber ring cavity; an analysis of an outgoing transmission model based on an on-chip micro-resonant cavity; and any combination thereof.

6. The method according to claim 1, wherein the outgoing laser electric field intensities $E_n$ are selected from the group consisting of: a transmitted laser electric field intensity $E_{tn}$ and a reflected laser electric field intensity $E_{rn}$.

7. The method according to claim 1, wherein in each of the cyclic propagation times n, the outgoing laser light intensity $I_n$ is greater than 0 in presence of a floating-point truncation error.

8. An electronic device, comprising a memory and a processor, wherein computer programs are stored in the memory, and the processor implements the steps of the method of claim 1 when executing the computer programs.

9. A non-transitory computer-readable storage medium for storing computer instructions, wherein the steps of the method of claim 1 are implemented when the computer instructions are executed by a processor.

* * * * *